(12) United States Patent
Yuasa

(10) Patent No.: US 12,140,431 B2
(45) Date of Patent: Nov. 12, 2024

(54) TRAVELING ASSISTING DEVICE FOR WORK VEHICLE AND THE WORK VEHICLE

(71) Applicant: KUBOTA CORPORATION, Osaka (JP)

(72) Inventor: Junichi Yuasa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 486 days.

(21) Appl. No.: 17/292,895

(22) PCT Filed: Sep. 24, 2019

(86) PCT No.: PCT/JP2019/037327
§ 371 (c)(1),
(2) Date: May 11, 2021

(87) PCT Pub. No.: WO2020/105275
PCT Pub. Date: May 28, 2020

(65) Prior Publication Data
US 2021/0404812 A1 Dec. 30, 2021

(30) Foreign Application Priority Data

Nov. 19, 2018 (JP) ................................. 2018-216562
Nov. 19, 2018 (JP) ................................. 2018-216563

(51) Int. Cl.
*G01C 21/20* (2006.01)
*A01B 69/00* (2006.01)
*G01C 21/00* (2006.01)

(52) U.S. Cl.
CPC .............. *G01C 21/20* (2013.01); *A01B 69/00* (2013.01); *G01C 21/3811* (2020.08)

(58) Field of Classification Search
CPC ................ G01C 21/20; G01C 21/3811; G01C 21/3697; A01B 69/00; A01B 37/00; A01B 69/008
See application file for complete search history.

(56) References Cited

U.S. PATENT DOCUMENTS

| 11,314,261 B2* | 4/2022 | Nishii ................. G05D 1/0219 |
| 2007/0005208 A1* | 1/2007 | Han ..................... A01B 69/001 701/50 |
| 2014/0277899 A1 | 9/2014 | Matsuzaki et al. |
| 2016/0169679 A1 | 6/2016 | Kajino et al. |

(Continued)

FOREIGN PATENT DOCUMENTS

| EP | 3 586 579 A1 | 1/2020 |
| JP | 9-120313 A | 5/1997 |

(Continued)

OTHER PUBLICATIONS

Machine Translated JP3572318B2 (Year: 2004).*

(Continued)

*Primary Examiner* — Anne Marie Antonucci
*Assistant Examiner* — Misa H Nguyen
(74) *Attorney, Agent, or Firm* — Greenblum & Bernstein, P.L.C.

(57) ABSTRACT

Provided is a traveling assisting device for a work vehicle which makes it easy to avoid local compaction of the soil. There is provided a route determination section that determines a target traveling route based on a ground-contact expected area which is an area where the traveling device is expected to contact the ground surface in the field.

22 Claims, 8 Drawing Sheets

(56) References Cited

U.S. PATENT DOCUMENTS

| | | |
|---|---|---|
| 2017/0168501 A1 | 6/2017 | Ogura et al. |
| 2018/0209793 A1 | 7/2018 | Sakaguchi et al. |
| 2018/0257657 A1 | 9/2018 | Blank et al. |
| 2019/0101931 A1 | 4/2019 | Ogura et al. |
| 2020/0000006 A1 | 1/2020 | Mcdonald et al. |

FOREIGN PATENT DOCUMENTS

| | | |
|---|---|---|
| JP | 10-66403 A | 3/1998 |
| JP | 3572318 B2 * | 9/2004 |
| JP | 2014-178759 A | 9/2014 |
| JP | 2016-106608 A | 6/2016 |
| JP | 2018-113942 A | 7/2018 |
| WO | 2015/119264 A1 | 8/2015 |

OTHER PUBLICATIONS

Machine Translated JP09120313 (Year: 1997).*
Extended European Search Report issued in European Patent Application No. 19886885.3 dated Jan. 25, 2022.
Decision of Refusal issued in Japanese Patent Application No. 2018-216562 dated Jan. 11, 2022, along with English translation thereof.
International Search Report issued in International Patent Application No. PCT/JP2019/037327, dated Dec. 17, 2019, along with English translation thereof.
Written Opinion of the International Searching Authority issued in International Patent Application No. PCT/JP2019/037327, dated Dec. 17, 2019, along with English translation thereof.

* cited by examiner

TRAVELING ASSISTING DEVICE FOR WORK VEHICLE AND THE WORK VEHICLE

TECHNICAL FIELD

The present invention relates to a traveling assisting device for use in a work vehicle traveling in a field.

BACKGROUND ART

As an example of a traveling assisting device of the above-noted kind, there is one known from the disclosure of Patent Document 1. This traveling assisting device includes a displaying section (described as a "display" in Patent Document 1) that displays a target traveling route.

BACKGROUND ART DOCUMENT

Patent Document 1: Japanese Unexamined Patent Application Publication No. 2018-113942

SUMMARY

Problem to be Solved by Invention

Incidentally, when a work vehicle travels in a field, soil present in an area where the traveling device such as tires, crawlers, etc. have contacted will be compacted and solidified. And, the soil at those portions in the field where the traveling device has contacted the ground surface for a plurality of times tend to be compacted locally (i.e. locally concentrated manner). Such local compaction tends to invite deterioration of water drainage, deterioration in the permeability of nutrition, and poor growth of roots.

A primary object of the present invention is to provide a traveling assisting device for a work vehicle which makes it easy to avoid such local compaction of the soil.

Solution

According to a characterizing feature of the present invention, there is provided a route determination section that determines a target traveling route based on a ground-contact expected area which is an area where the traveling device is expected to contact the ground surface in the field.

With the above-described invention, a target traveling route can be easily determined so that such portions in the field where the traveling device comes into contact with the ground surface for a plurality of times may be reduced. With this, it has become possible to realize a traveling assisting device for a work vehicle which makes it easy to avoid such local compaction of the soil.

In the present invention, preferably, the route determination section determines the target traveling route so that of the ground-contact expected area, a portion thereof overlapped with another ground-contact expected area may be reduced.

With the above-described arrangement, when the work vehicle has traveled along the determined target traveling route, the portions in the field where the traveling device contacts the ground surface of a plurality of times are reduced. Thus, the local compaction of the soil can be avoided in a reliable manner.

Further, in the present invention, preferably, the route determination section determines the target traveling route such that of the ground-contact expected area, portions thereof overlapped with another ground-contacted expected area may be reduced in number to be equal to or fewer than a predetermined number.

With the above-described arrangement, in comparison with an arrangement of determining the target traveling route without taking into consideration the number of the portions where the ground-contact expected areas are overlapped with each other, it is readily possible to reduce the number of portions in the field where the traveling device contact the ground surface for a plurality of times, when the work vehicle has traveled along the target traveling route. With this, the local compaction of the soil can be avoided in a more reliable manner.

Further, in the present invention, preferably, there are further provided:

a compaction-related information acquisition section for acquiring compaction-related information which is information relating to compaction of the soil by the ground surface contact of the traveling device; and an expected compaction degree calculation section for calculating a degree of compaction expected to occur when the traveling device contacts the ground surface in the ground-contact expected area; and the route determination section determines the target traveling route such that the expected compaction degree may become equal to or less than a predetermined first threshold value.

With the above-described arrangement, it becomes readily possible to reduce the degree of soil compaction when the work vehicle has traveled along the target traveling route. With this, adverse effect due to soil compaction can be suppressed easily.

Further, in the present invention, the compaction-related information acquisition section acquires at least any one of information indicative of an axle load (axle weight), information indicative of a vehicle speed, information indicative of a steering angle, information indicative of a traveling direction, information indicative of specification of the traveling device, information indicative of a slope (a gradient) of the ground surface, and information indicative of a number of passes made by the traveling device.

In accordance with an axle load (axle weight), a vehicle speed, a steering direction, a traveling direction, specification of the traveling device, a slope of the ground surface, a number of passes made by the traveling device, the degree of compaction of the soil when the traveling device contacts the ground surface varies.

Namely, the information indicative of an axle load (axle weight), the information indicative of a vehicle speed, the information indicative of a steering angle, the information indicative of a traveling direction, the information indicative of specification of the traveling device, the information indicative of a slope (a gradient) of the ground surface, and the information indicative of a number of passes made by the traveling device are all "compaction-related information".

Therefore, with the above-described arrangement, the compaction-related information acquisition section can acquire the compaction-related information reliably, whereby the expected compaction degree can be calculated reliably.

Moreover, in the present invention, preferably, there is provided a crushing work timing estimation section for estimating a timing needing subsoil crushing work, based on the expected compaction degree.

With the above-described arrangement, it becomes possible for an operator to grasp a timing needing subsoil crushing work.

Further, in the present invention, preferably, there are provided:
- an expected-compaction degree determination section that determines whether the expected compaction degree exceeds a predetermined second threshold value or not; and
- an alarming section that issues an alarm if the expected compaction degree is determined to exceed the second threshold value.

With the above-described arrangement, in case the expected compaction degree is relatively high, the operator can recognize this reliably.

Further, in the present invention, preferably, there is provided:
- a displaying section that displays the ground-contact expected areas; and
- the displaying section displays the portions of the ground-contact expected area overlapped with another or other ground-contact expected area(s) in forms different from each other in accordance with the number of the overlapped ground-contact expected areas.

With the above-described arrangement, the operator can easily grasp the portions expected to be ground-contacted by the traveling device for a plurality of times in the field. Moreover, the operator can easily grasp the expected number of times of the contacts with the traveling device in such portions.

Further, in the present invention, preferably, the displaying section is configured to be capable of switchably displaying the ground-contact expected area and the target traveling route.

With the above-described arrangement, the operator can selectively use displaying of the expected ground-contact area and displaying of the target traveling route, depending on the situation.

Further, in the present invention, preferably, the displaying section is capable of displaying a ground-contacted area which is an area where the traveling device has contacted the ground surface in the field; and
- the displaying section is capable of simultaneously displaying a portion in the target traveling route where the work vehicle has not yet traveled and the ground-contacted areas.

With the above-described arrangement, the operator can confirm in real time the ground-contacted area while causing the work vehicle to travel along the target traveling route.

Moreover, in the present invention, preferably:
- there is provided a storage section for storing a ground-contacted area which is an area where the traveling device has contacted the ground surface in the field; and
- the route determination section is capable of executing a distributed route determination which is a process to determine the target traveling route such that a portion of the ground-contact expected area overlapped with the ground-contacted area may be reduced or that the number of portions of the ground-contact expected area overlapped with the ground-contacted area may be equal to or less than a predetermined number.

With the above-described arrangement, when the work vehicle has traveled along the target traveling route determined by the distributed route determination, the portions where the traveling device comes into contact with the ground surface for a plurality of times in the field becomes relatively few. Thus, the local compaction of the soil can be avoided in an even more reliable manner.

Further, in the present invention, preferably:
- there is provided a storage section for storing a ground-contacted area which is an area where the traveling device has contacted the ground surface in the field; and
- the route determination section is capable of executing a concentrated route determination which is a process to determine the target traveling route such that a portion of the ground-contact expected area overlapped with the ground-contacted area may be increased or that the number of portions of the ground-contact expected area overlapped with the ground-contacted area may be equal to or greater than a predetermined number.

With the above-described arrangement, when the work vehicle has traveled along the target traveling route determined by the concentrated route determination, at portions other than the ground-contacted areas in the field, the traveling device will come into contact with the ground surface less likely. Thus, the compaction of the soil at portions other than the ground-contacted areas in the field can be readily avoided.

Moreover, in the present invention, preferably:
- the route determination section is capable of executing a concentrated route determination which is a process to determine the target traveling route such that a portion of the ground-contact expected area overlapped with the ground-contacted area may be increased or that the number of portions of the ground-contact expected area overlapped with the ground-contacted area may be equal to or greater than a predetermined number; and
- there is provided a selection section capable of selecting a process to be executed by the route determination section from among a plurality of kinds of processes including the distributed route determination and the concentrated route determination.

With the above-described arrangement, it becomes possible for the user to make selection from among a plurality of kinds of processes including the distributed route determination and the concentrated route determination.

Further, a work vehicle relating to the present invention includes the above-described traveling assisting device for a work vehicle.

With the above-described invention, a target traveling route can be easily determined so that such portions in the field where the traveling device comes into contact with the ground surface for a plurality of times may be reduced. With this, it has become possible to realize a traveling assisting device for a work vehicle which makes it easy to avoid such local compaction of the soil.

Moreover, in the present invention, preferably:
- there is provided a storage section for storing a ground-contacted area which is an area where the traveling device has contacted the ground surface in the field; and
- there is provided a displaying section for displaying the ground-contacted area.

With the above-described invention, the operator can grasp the ground-contacted area by viewing the displaying section. Therefore, the operator can easily cause the work vehicle to travel in such a manner to circumvent the ground-contacted area. With this, it becomes easy to prevent the traveling device from coming into contact with the ground surface for a plurality of time at a same location in the field.

Namely, with the present invention, there can be realized a traveling assisting device for a work vehicle with which local compaction of the soil can be readily avoided.

Further, in the present invention, preferably, the storage section stores at least two ground-contacted areas in correspondence with the traveling devices on the left and right sides.

In case the work vehicle includes left and right traveling devices, it is conceivable to store areas passed by the left and right traveling devices respectively and the portion between the left and right traveling devices, as one "ground-contacted area". In that case, the ground-contacted area will be a band-like area having the width between the left and right traveling devices. However, within this band-like area, the traveling devices have not actually come into the ground surface at the portion at the widthwise center of the area.

Namely, an area larger than the actually ground-contacted areas of the left and right traveling devices will be displayed as the ground-contacted area inappropriately.

Here, with the above-described arrangement, it is possible to realize an arrangement of storing only the actually ground-contacted areas of the left and right traveling devices as the ground-contacted area. Therefore, it is possible to avoid the situation of an area larger than the actually ground-contacted areas of the left and right traveling devices being displayed as the ground-contacted area inappropriately.

Further, in the present invention, preferably, the displaying section displays the portions of the ground-contacted areas where the ground-contacted areas are overlapped with each other in a displaying mode which differs in accordance with the number of the overlapped ground-contacted areas.

With the above-described arrangement, the operator can readily grasp the portions in the field where the traveling devices have come into contact with the ground surface for a plurality of times. Moreover, the operator can readily grasp also the number of times of the ground contacts made by the traveling devices at such portions.

Further, in the present invention, preferably, the displaying section is capable of switchably displaying the ground-contacted area and a traveling trajectory.

With the above-described arrangement, the operator can selectively use displaying of the ground-contacted areas and displaying of the traveling trajectory selectively, depending on a situation.

Further, in the present invention, preferably, there is provided a route determination section that determines a target traveling route based on a ground-contact expected area which is an area where the traveling device is expected to contact the ground surface in the field.

With the above-described arrangement, it is possible to realize an arrangement that a target traveling route is determined with taking into consideration the degree of compaction of the soil provided by the ground contact of the traveling device.

Further, in the present invention, preferably:
the displaying section is capable of displaying the target traveling route; and
the displaying section is capable of simultaneously displaying a portion in the target traveling route where the work vehicle has not yet traveled and the ground-contacted area.

With the above-described arrangement, the operator can confirm in real time the ground-contacted areas while causing the work vehicle to travel along the target traveling route.

Further, in the present invention, preferably, the route determination section determines the target traveling route such that of the ground-contact expected area, a portion thereof overlapped with the ground-contacted area or a portion thereof overlapped with another ground-contact expected area may be reduced.

With the above-described arrangement, in case the work vehicle has traveled along a determined target traveling route, the number of the portions thereof where the traveling device has contacted the ground surface may be relatively small. With this, the local compaction of the soil can be avoided in a more reliable manner.

Further, in the present invention, preferably, the route determination section determines the target traveling route such that of the ground-contact expected area, a portion thereof overlapped with the ground-contacted area or a portion thereof overlapped with another ground-contact expected area may be reduced in number to be equal to or fewer than a predetermined number.

With the above-described arrangement, in comparison with an arrangement of determining the target traveling route without taking into consideration the number of the portions where the ground-contacted areas are overlapped with each other or the number of the portions where the ground-contact expected areas are overlapped with each other, it is readily possible to reduce the number of portions in the field where the traveling device contact the ground surface for a plurality of times, when the work vehicle has traveled along the target traveling route. With this, the local compaction of the soil can be avoided in a more reliable manner.

Further, in the present invention, preferably, there are further provided:
a compaction-related information acquisition section for acquiring compaction-related information which is information relating to compaction of the soil by the ground surface contact of the traveling device; and
an expected compaction degree calculation section for calculating a degree of compaction expected to occur when the traveling device contacts the ground surface in the ground-contact expected area; and
the route determination section determines the target traveling route such that the expected compaction degree may become equal to or less than a predetermined first threshold value.

With the above-described arrangement, it becomes readily possible to reduce the degree of soil compaction when the work vehicle has traveled along the target traveling route. With this, adverse effect due to the soil compaction can be suppressed easily.

Further, in the present invention, the compaction-related information acquisition section acquires any one of information indicative of an axle load (axle weight), information indicative of a vehicle speed, information indicative of a steering angle, information indicative of a traveling direction, information indicative of specification of the traveling device, information indicative of a slope of the ground surface, and information indicative of a number of passes made by the traveling device.

In accordance with an axle load (axle weight), a vehicle speed, a steering direction, a traveling direction, specification of the traveling device, a slope of the ground surface, a number of passes made by the traveling device, the degree of compaction of the soil when the traveling device contacts the ground surface varies.

Namely, the information indicative of an axle load (axle weight), the information indicative of a vehicle speed, the information indicative of a steering angle, the information indicative of a traveling direction, the information indicative of specification of the traveling device, the information indicative of a slope (a gradient) of the ground surface, and the information indicative of a number of passes made by the traveling device are all "compaction-related information".

Therefore, with the above-described arrangement, the compaction-related information acquisition section can acquire the compaction-related information reliably, whereby the expected compaction degree can be calculated reliably.

Further, in the present invention, preferably, there is provided a soil compaction degree calculation section for calculating a soil compaction degree which is a degree of the soil compaction in the ground-contacted area, based on the compaction-related information.

With the above-described arrangement, it is possible to realize an arrangement of presenting to the operator an appropriate work in accordance with the calculated soil compaction degree.

Moreover, in the present invention, preferably, there is provided a crushing work timing estimation section for estimating a timing needing subsoil crushing work, based on the soil compaction degree.

With the above-described arrangement, it becomes possible for an operator to grasp a timing needing subsoil crushing work.

Further, in the present invention, preferably, there are provided:

a soil compaction degree determination section that determines whether the soil compaction degree exceeds a second threshold value or not; and an alarming section that issues an alarm if the soil compaction degree determination section determines that the soil compaction degree exceeds the second threshold value.

With the above-described arrangement, in case the soil compaction degree is relatively large, the operator can grasp this in a reliable manner.

Further, a work vehicle relating to the present invention includes the above-described traveling assisting device for a work vehicle.

With the above-described invention, the operator can grasp the ground-contacted area by viewing the displaying section. Therefore, the operator can easily cause the work vehicle to travel in such a manner to avoid the ground-contacted area. With this, it becomes easy for the traveling device to avoid coming into contact with the ground surface for a plurality of time at a same location in the field.

Namely, with the present invention, it is possible to realize a work vehicle with which it is readily possible to avoid local soil compaction.

EMBODIMENTS

Next, modes of embodying the present invention will be explained with reference to the accompanying drawings. Incidentally, in the following explanation, unless explicitly indicated otherwise, the front and back (reverse) directions will be described as follows. Namely, the advancing direction on the forward traveling side at the time of a work traveling of the machine body is defined as "front", and the advancing direction on the reverse traveling side is defined as "rear". And, the direction corresponding to the right side relative to the front facing posture in the front/rear direction is defined as "right and the direction corresponding to the left side is defined as "left".

[General Configuration of Tractor]

Figure 1:
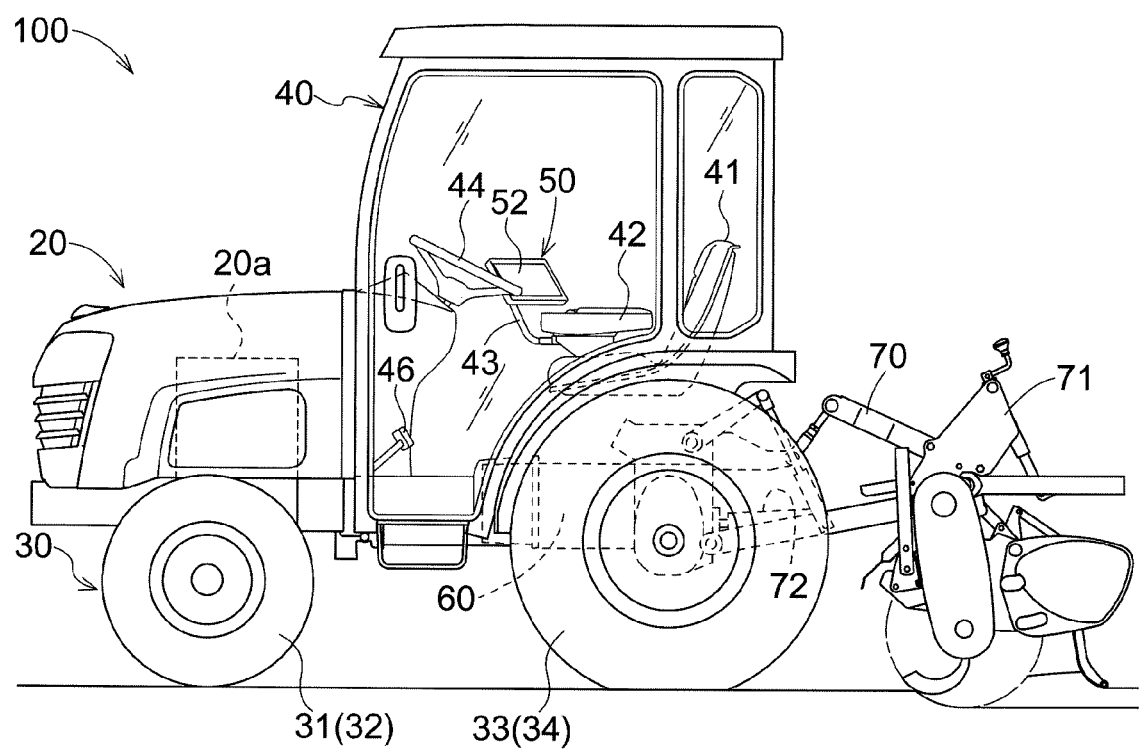
FIG. 1 is a left side view of a tractor.

FIG. 1 is a view showing a configuration of a tractor 100 (corresponding to a "work vehicle" relating to the present invention). The tractor 100 is configured to be capable of work traveling by automated or autonomous driving.

As shown in FIG. 1, at a machine body front portion of the tractor 100, an engine section 20 is provided. This engine section 20 includes an engine 20a. Further, the tractor 100 includes traveling wheels 30. The traveling wheels 30 include a left front wheel 31, a right front wheel 32, a left rear wheel 33 (corresponding to a "traveling device" relating to the present invention) and a right rear wheel 34 (corresponding to a "traveling device" relating to the present invention).

Power of the engine 20a is transmitted to the traveling wheels 30 via a main clutch (not shown) and a transmission 60. And, with this power, the traveling wheels 30 are driven.

Rearwardly of the engine section 20, a driving section 40 is provided. As shown in FIG. 1, the driving section 40 includes a driver's seat 41, an armrest 42, a support arm 43, a steering wheel 44, a shuttle lever (not shown), a clutch pedal 46, left and right brake pedals (not shown) and an operation terminal 50. The operation terminal 50 includes a touch panel 52 (corresponding to a "displaying section" and an "alarming section" relating to the present invention). At the driving section 40, an operator (corresponding to a "user" relating to the present invention) can carry out various driving operations manually.

As shown in FIG. 1, the operation terminal 50 is supported to the support arm 43. Further, the operator can carry out a steering operation of the left front wheel 31 and the right front wheel 32 by operating the steering wheel 44.

Further, the operator can carry out switchover between the forward traveling and the reverse traveling of the tractor 100 by operating the shuttle lever.

Moreover, the operator can carry out on/off operations of the main clutch by operating the clutch pedal 46.

Further, the operator can carry out left and right parking brake operations by operating the left and right brake pedals.

As shown in FIG. 1, to a rear portion of the tractor 100, there is attached a cultivator implement 71 via a lift mechanism 70. To the cultivator implement 71, power of the engine 20a is transmitted via a PTO shaft 72. And, with this power, the cultivator implement 71 is driven.

The tractor 100 can effect a work traveling while driving the cultivator implement 71.

[Configuration of Traveling Assisting Device]

Figure 2:
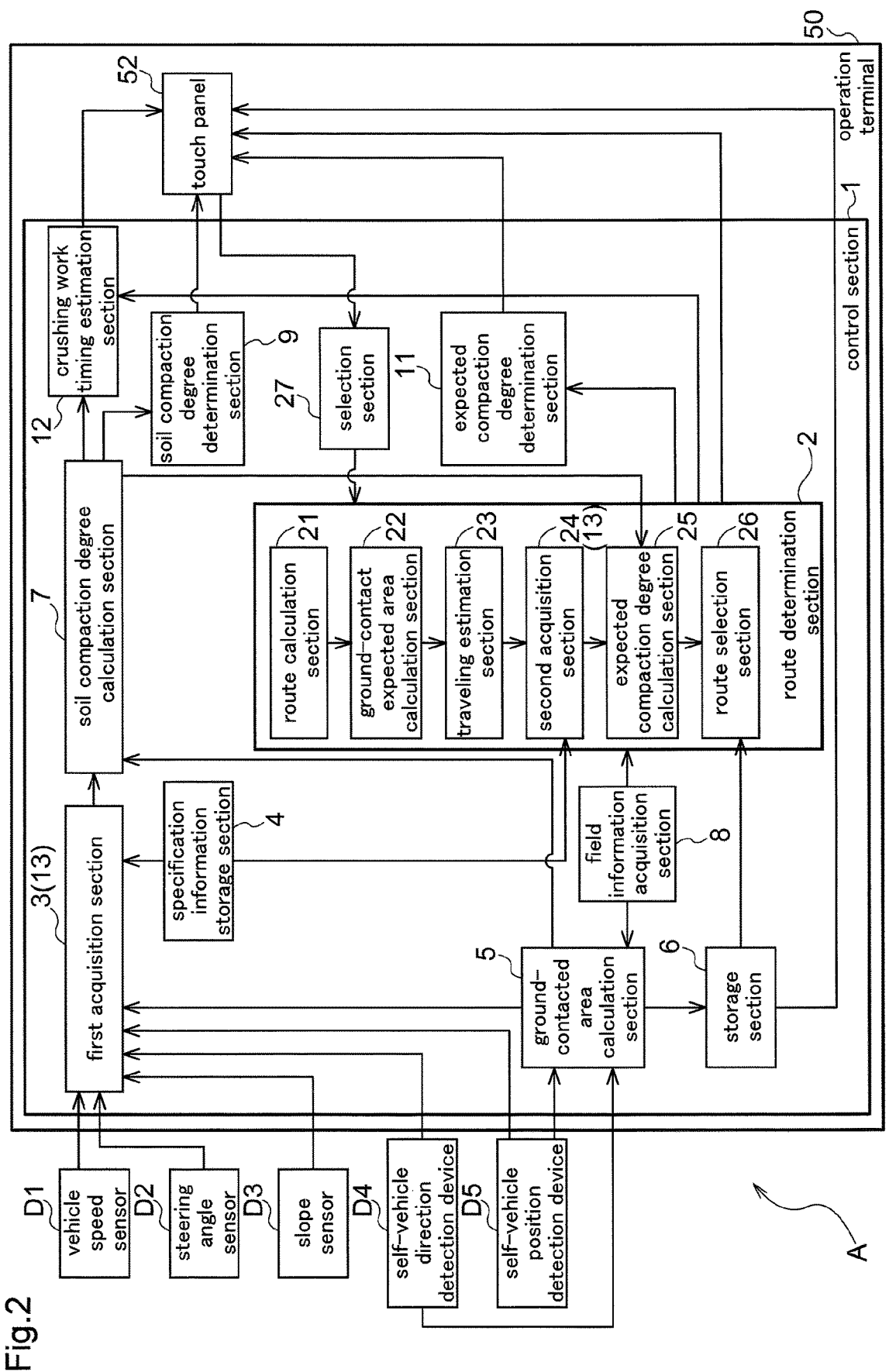
FIG. 2 is a block diagram showing a configuration of a traveling assisting device.

As shown in FIG. 2, the tractor 100 includes a traveling assisting device A. The traveling assisting device A includes a vehicle speed sensor D1, a steering angle sensor D2, a slope sensor D3, a self-vehicle direction detection device D4, and a self-vehicle position detection device D5. It is also noted that the operation terminal 50 too is included in this traveling assisting device A.

And, the operation terminal 50 includes a control section 1.

The present invention is not limited to the above configuration. Alternatively, the control section 1 may be included in an onboard (vehicle-mounted) microcomputer disposed anywhere other than the operation terminal 50 of the tractor 100 or may be included in a management center (not shown) installed outside the tractor 100.

Further, the control section 1 includes a route determination section 2, a first acquisition section 3, a specification information storage section 4, a ground-contacted area calculation section 5, a storage section 6, a soil compaction degree calculation section 7, a field information acquisition section 8, a soil compaction degree determination section 9, an expected compaction degree determination section 11, a crushing work timing estimation section 12, and a selection section 27.

The route determination section 2 includes a route calculation section 21, a ground-contact expected area calculation section 22, a traveling estimation section 23, a second acquisition section 24, an expected compaction degree calculation section 25 and a route selection section 26.

Further, the control section 1 includes a compaction related information acquisition section 13. The first acquisition section 3 and the second acquisition section 24 are included in the compaction related information acquisition section 13.

[Displaying of Ground-Contacted Area]

The self-vehicle direction detection device D4 detects a traveling direction of the self vehicle over time. The detected traveling direction is sent to the ground-contacted area calculation section 5.

The self-vehicle position detection device D5 detects a self vehicle position over time. The detected self vehicle position is sent to the ground-contacted area calculation section 5.

Further, as described above, outside the tractor 100, the management center is installed. The field information acquisition section 8 acquires from the management center, various kinds of information relating to a field W in which the tractor 100 carries out a work traveling. This information includes information on e.g. the position of the field W, the shape (contour) of the field W, etc. The information acquired by the field information acquisition section 8 is sent to the ground-contacted area calculation section 5.

And, the ground-contacted area calculation section 5 calculates a ground-contacted area P, based on the traveling direction received from the self-vehicle direction detection device D4, the self-vehicle position received from the self-vehicle position detection device D5, and the information received from the field information acquisition section 8. Incidentally, the ground-contacted area P is an area where the left rear wheel 33 or the right rear wheel 34 has contacted the ground surface in the field W.

As shown in FIG. 2, the ground-contacted area P calculated by the ground-contacted area calculation section 5 is stored in the storage section 6.

Figure 3:
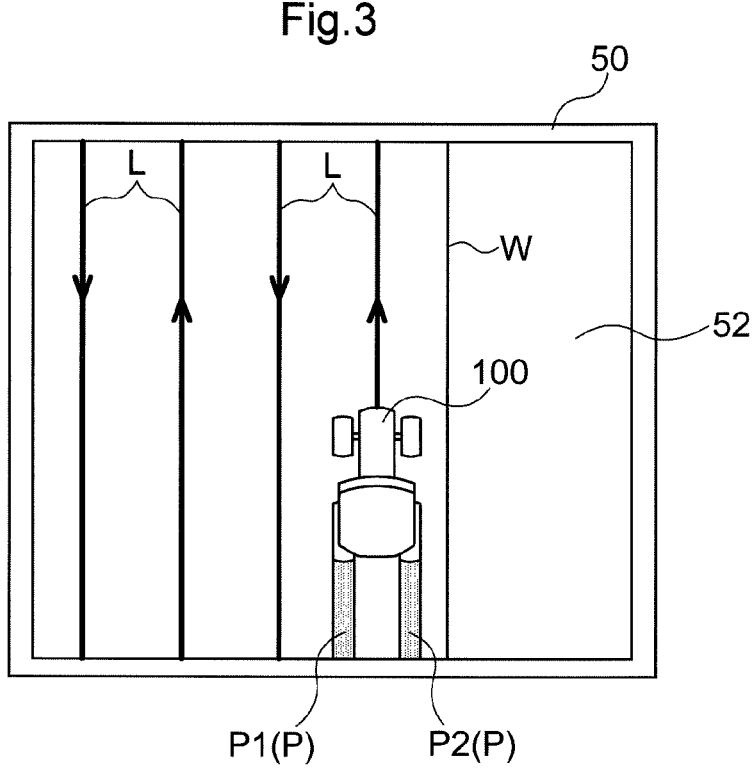
FIG. 3 is a view showing display contents of a touch panel.

The ground-contacted area P stored in the storage section 6 is sent to the touch panel 52. And, the touch panel 52 displays the ground-contacted area P as illustrated in FIG. 3.

Referring more particularly to the ground-contacted area P, the ground-contacted area calculation section 5 calculates a first ground-contacted area P1 and a second ground-contacted area P2. The first ground-contacted area P1 is the ground-contacted area P corresponding to the left rear wheel 33. And, the second ground-contacted area P2 is the ground-contacted area P corresponding to the right rear wheel 34.

Namely, the storage section 6 in this embodiment stores two ground-contacted areas P in correspondence with the left rear wheel 33 and the right rear wheel 34.

However, the present invention is not limited to the above-described arrangements. For instance, the ground-contacted area calculation section 5 may be configured to calculate four ground-contacted areas P in correspondence with the left front wheel 31, the right front wheel 32, the left rear wheel 33 and the right rear wheel 34 and the storage section 6 may store these ground-contacted areas P. Further alternatively, the ground-contacted area calculation section 5 may be configured to calculate one ground-contacted area P only and the storage section 6 may store this ground-contacted area P. Namely, the number of the ground-contacted areas P to be stored in the storage section 6 may be any number equal to or greater than one.

Figure 4:
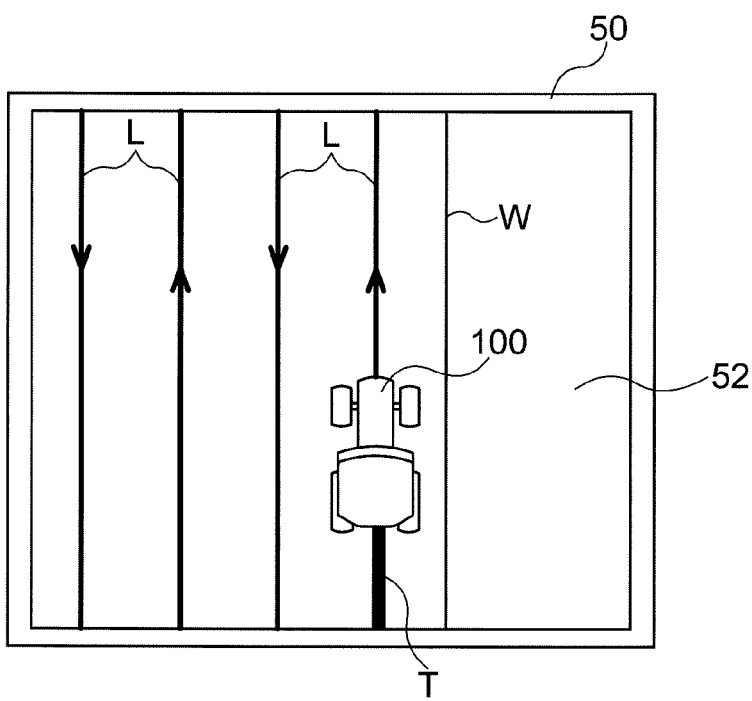
FIG. 4 is a view showing display contents of the touch panel.

Further, in response to an operation on the touch panel 52 by the operator, the touch panel 52 switchably displays the ground-contacted area(s) P or a traveling trajectory T, as shown in FIG. 3 and FIG. 4.

Namely, the touch panel 52 can switchably display the ground-contacted area(s) P or the traveling trajectory T.

Figure 5:
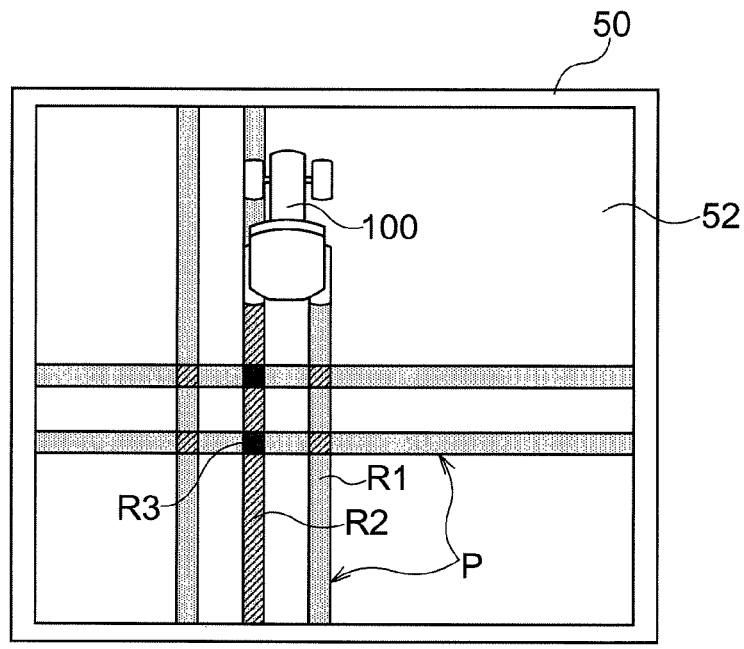
FIG. 5 is a view showing ground-contacted areas displayed on the touch panel.

Further, as shown in FIG. 5, the touch panel 52 displays, of the ground-contacted area P, a portion thereof overlapped with another ground-contacted area P (or other ground-contacted areas P) in displaying modes made different from each other in accordance with the number of such overlapped ground-contacted areas P.

More particularly, of the ground-contacted area P, the touch panel 52 displays a portion thereof not overlapped with another (other) ground-contacted area(s) P in green color. Further, of the ground-contacted area P, the touch panel 52 displays a portion thereof where two ground-contacted areas P are overlapped with each other in yellow color. Further, of the ground-contacted area P, the touch panel 52 displays portions where three ground-contacted areas P are overlapped with each other in red color.

Namely, the touch panel 52 displays, of the ground-contacted area P, the portions thereof of mutual overlapping of the ground-contacted area(s) P in colors different from each other in correspondence with the number of such overlapped ground-contacted areas P.

In the example illustrated in FIG. 5, the tractor 100 has passed a first area R1 only once. Namely, in this first area R1, the left rear wheel 33 or the right rear wheel 34 has come into contact with the ground surface only one time.

Further, the tractor 100 has passed a second area R2 two times. Namely, in the second area R2, the left rear wheel 33 or the right rear wheel 34 has come into contact with the ground surface two times.

Further, the tractor 100 has passed a third area R3 three times. Namely, in this third area R3, the left rear wheel 33 or the right rear wheel 34 has come into contact with the ground surface three times.

In the above, of the ground-contacted area P, in the first area R1, there is no overlap between the ground-contacted areas P. For this reason, this first area R1 is displayed in the green color.

Further, of the ground-contacted area P, in the second area R2, two ground-contacted areas P are overlapped with each other. For this reason, this second area R2 is displayed in the yellow color.

Further, of the ground-contacted area P, in the third area R3, three ground-contacted areas P are overlapped with each other. For this reason, this third area R3 is displayed in the red color.

Figure 6:
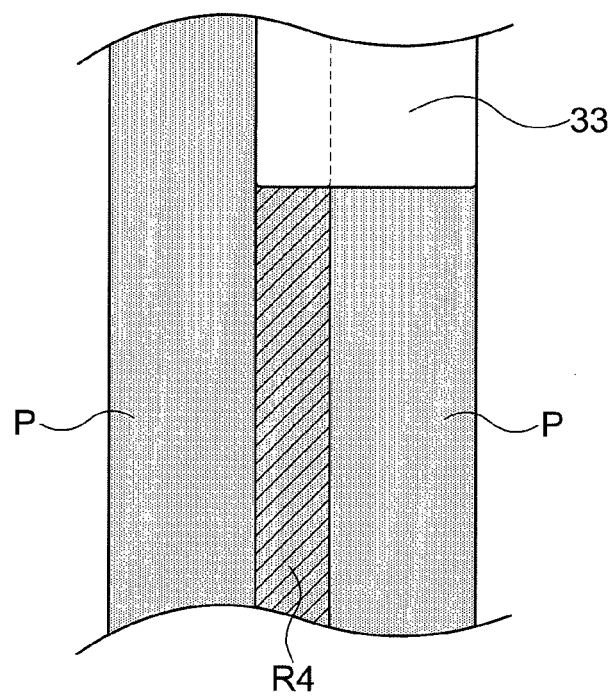
FIG. 6 is a view showing ground-contacted areas displayed on the touch panel.

Also, in an example illustrated in FIG. 6, in a fourth area RA, two ground-contacted areas P are partially overlapped with each other. In this case, of the ground-contacted area P, the fourth area RA alone is displayed in the yellow color and the remaining portions thereof are displayed in the green color.

[Target Traveling Route]

The vehicle speed sensor D1 shown in FIG. 2 detects a vehicle speed of the tractor 100 over time. The detected vehicle speed (corresponding to "information indicative of a vehicle speed" relating to the present invention) is sent to the first acquisition section 3.

The steering angle sensor D2 detects a steering angle of the left front wheel 31 and the right front wheel 32 over time. The detected steering angle (corresponding to "information indicative of a steering angle" relating to the present invention) is sent also to the first acquisition section 3.

The slope sensor D3 detects a slope (tilt) angle of the machine body over time. The detected slope angle (corresponding to "information indicative of a slope of the ground surface" relating to the present invention) is sent also to the first acquisition section 3.

Further, a vehicle direction detected by the self-vehicle direction detection device D4 is sent also to the first acquisition section 3.

Incidentally, this traveling direction corresponds to "information indicative of a traveling direction" relating to the present invention.

Further, a self-vehicle position detected by the self-vehicle position detection device D5 is sent also to the first acquisition section 3.

Then, in the first acquisition section 3, the vehicle speed, the steering angle, the traveling direction and the slope angle are correlated with the self-vehicle position. With this, the first acquisition section 3 acquires a vehicle speed, a steering angle, a traveling direction and a slope angle of the tractor 100 corresponding to each position in the field W.

The specification information storage section 4 stores various kinds of specification information of the tractor 100. This specification information includes information relating to a material, a shape, a ground-contacting area e.g. of the left rear wheel 33 and the right rear wheel 34 (corresponding to "information indicative of the specification of the traveling device" relating to the present invention) as well as information indicative of an axle load (axle weight).

This specification information is sent to the first acquisition section 3 and also to the second acquisition section 24.

Further, the ground-contacted area calculation section 5 generates information indicative of the number of passages of each position in the field W by the left rear wheel 33 and the right rear wheel 34 (corresponding to "information indicative of number of passages by traveling device" relating to the present invention). Such generated information is sent also to the first acquisition section 3.

As described above, the first acquisition section 3 acquires various kinds of information. And, these information constitute "compaction-related information". Incidentally, the compaction-related information comprise information relating to compaction of the soil by the ground-contact with the left rear wheel 33 and the right rear wheel 34.

The compaction related information acquired by the first acquisition section 3 are sent to the soil compaction degree calculation section 7.

The soil compaction degree calculation section 7 acquires information indicative of the ground-contacted area P from the ground-contacted area calculation section 5. And, the soil compaction degree calculation section 7 calculates a soil compaction degree from the compaction related information received from the first acquisition section 3 and the information indicative of the ground-contacted area P received from the ground-contacted area calculation section 5. Incidentally, the soil compaction degree means a degree of soil compaction in the ground-contacted area P.

In this embodiment, the soil compaction degree calculation section 7 calculates a soil compaction degree corresponding to each position in the ground-contacted area P. Such calculated soil compaction degree is sent to the expected compaction degree calculation section 25.

Further, information acquired by the field information acquisition section 8 is sent to the route determination section 2.

Further, the information indicative of the ground-contacted areas P stored in the storage section 6 is sent to the route selection section 26.

And, the route determination section 2 determines a target traveling route L for the tractor 100. Next, with reference to FIG. 2, determination of the target traveling route L will be explained in details.

When the route determination section 2 is to determine the target traveling route L, firstly, in the route calculation section 21, based on the information received from the field information acquisition section 8, there are calculated a plurality of candidate routes as candidates for the target traveling route L. In the instant embodiment, in the above, five such candidate routes different from each other are calculated. These calculated candidate routes are sent to the ground-contact expected area calculation section 22.

Then, the ground-contact expected area calculation section 22 calculates a ground-contact expected area Q in which the tractor 100 is to travel along each candidate route calculated by the route calculation section 21. Incidentally, the ground-contact expected areas Q are the areas where the left rear wheel 33 and the right rear wheel 34 are expected to come into contact with the ground surface in the field W. Such each calculated ground-contact expected area Q is sent to the traveling estimation section 23 in correspondence with each candidate route.

Then, based on the respective ground-contact expected area Q and the respective candidate route received from the ground-contact expected area calculation section 22, the traveling estimation section 23 estimates a behavior of the tractor 100 which will occur in case this tractor 100 travels along each candidate route. And, based on the estimation result, the traveling estimation section 23 generates compaction-related information corresponding to each position in the field W, in correspondence with each candidate route.

Specifically, in the above, based on the expected behavior of the tractor 100, the traveling estimation section 23 generates, in correspondence with each position of the tractor 100 in the field W, a vehicle speed (corresponding to the "information indicative of a vehicle speed" relating to the present invention), a steering angle (corresponding to "information indicative of a steering angle" relating to the present invention), a traveling direction (corresponding to "information indicative of a traveling direction" relating to the present invention), a slope angle (corresponding to "information indicative of a slope of the ground surface" relating to the present invention) and a number of passages of the left rear wheel 33 and the right rear wheel 34 (corresponding to "information indicative of number of passes by the traveling device" relating to the present invention).

The compaction related information generated by the traveling estimation section 23 are sent to the second acquisition section 24.

In this way, the compaction related information acquisition section 13 acquires the compaction related information.

The compaction related information acquired by the second acquisition section 24 are sent to the expected compaction degree calculation section 25 in correspondence with each candidate route and each ground-contact expected area Q.

The expected compaction degree calculation section 25 calculates, for each candidate route, an expected compaction degree, based on the compaction related information received from the second acquisition section 24 and the soil compaction degree received from the soil compaction degree calculation section 7. Incidentally, the expected compaction degree is a degree of compaction expected in case the left rear wheel 33 and the right rear wheel 34 come into contact with the ground surface in the ground-contact expected area Q.

Further, the expected compaction degree in the instant embodiment is an expected value of the soil compaction after the left rear wheel 33 and the right rear wheel 34 came into contact with the ground surface in the ground-contact expected area Q. However, the present invention is not limited thereto. Alternatively, the expected compaction degree may be a value corresponding to a difference between the soil compaction degree before the left rear wheel 33 and the right rear wheel 34 come into contact with the ground surface in the ground-contact and the soil compaction degree after such contact.

In the instant embodiment, the expected compaction degree calculation section 25 calculates an expected compaction degree corresponding to each position in the ground-contact expected area Q. Such calculated expected compaction degree is sent to the route selection section 26 in correspondence with each candidate route and each ground-contact expected area Q.

The route selection section 26 extracts each candidate route that satisfies a condition of "a corresponding expected compaction degree is equal to or smaller than a predetermined first threshold value" from among the respective candidate routes.

Incidentally, in the instant embodiment, in case all of respective expected compaction degrees corresponding to the respective positions in the ground-contact expected area Q are found equal to or smaller than the predetermined first threshold value, then, it is determined that the expected compaction degree is equal to or smaller than the first threshold value. However, the present invention is not limited thereto. In an alternative arrangement, it is determined that the expected compaction degree is equal to or smaller than the predetermined first threshold value, in case an average value of the respective expected compaction degrees corresponding to the respective positions in the ground-contact expected area Q is equal to or smaller than the first threshold value.

Next, the route selection section 26 calculates an area overlapped portion in the corresponding ground-contact expected area Q for each candidate route, based on the information indicative of the ground-contacted area P received from the storage section 6. Incidentally, the term "area overlapped portion" is a generic reference to a portion of the ground-contact expected area Q overlapped with a ground-contacted area P and a portion where ground-contact expected areas Q are mutually overlapped with each other.

And, the route selection section 26 selects a candidate route which has a minimal area overlapped portion in the corresponding ground-contact expected area Q among the respective candidate routes extracted. Such selected candidate route is determined as the target traveling route L.

As described above, the route determination section 2 determines the target traveling route L, based on the ground-contact expected area Q. Further, the route determination section 2 determines the target traveling route L such that a portion of the ground-contact expected area Q overlapped with a ground-contacted area P or a portion where the ground-contact expected areas Q are mutually overlapped with each other may be minimal. Further, the route determination section 2 determines the target traveling route L such that the expected compaction degree may be equal to or smaller than the predetermined first threshold value.

Meanwhile, the timing of the route determination section 2 to determine the target traveling route L may be prior to start of work traveling of the tractor 100 in the field W or may be after the start of the work traveling.

In case the target traveling route L is determined before the tractor 100 starts the work traveling in the field W, no ground-contacted area P is present yet. Therefore, in such case, the route determination section 2 will determine the target traveling route L in such a manner that the portion of mutual overlapping of the ground-contact expected areas Q may be small.

Also, the route determination section 2 may be configured to determine such target traveling route L that covers the field W entirely. Further alternatively, the route determination section 2 may be configured to determine target traveling routes L one after another in association with progress of the work traveling of the tractor 100.

In the following, with reference to FIG. 7 and FIG. 8, explanation will be made with taking a specific example in connection with the selection of the candidate route by the route selection section 26. In this specific example, it is assumed that as a candidate route satisfying the condition of "corresponding expected compaction degree is equal to or smaller than the predetermined first threshold value", a first candidate route C1 shown in FIG. 7 and a second candidate route C2 shown in FIG. 8 have been extracted. Further, in this specific example, it is also assumed that the route determination section 2 determines such target traveling route L that covers the field W entirely, before the tractor 100 starts a work traveling in the field W.

Both the first candidate route C1 and the second candidate route C2 are routes in which the tractor 100 enters the field W via an exit/entrance Wa, effects work traveling in the entire field W by back and forth traveling and then returns to the exit/entrance Wa from a work completion location Wb. And, in the first candidate route C1 and the second candidate route C2, the portions thereof from the entry by the tractor 100 to the field W via the exit/entrance Wa and arrival at the work completion location Wb are same.

However, in the first candidate route C1 and the second candidate route C2, the route portions thereof from the work completion location Wb to return to the exit/entrance Wa are different from each other.

Figure 7:
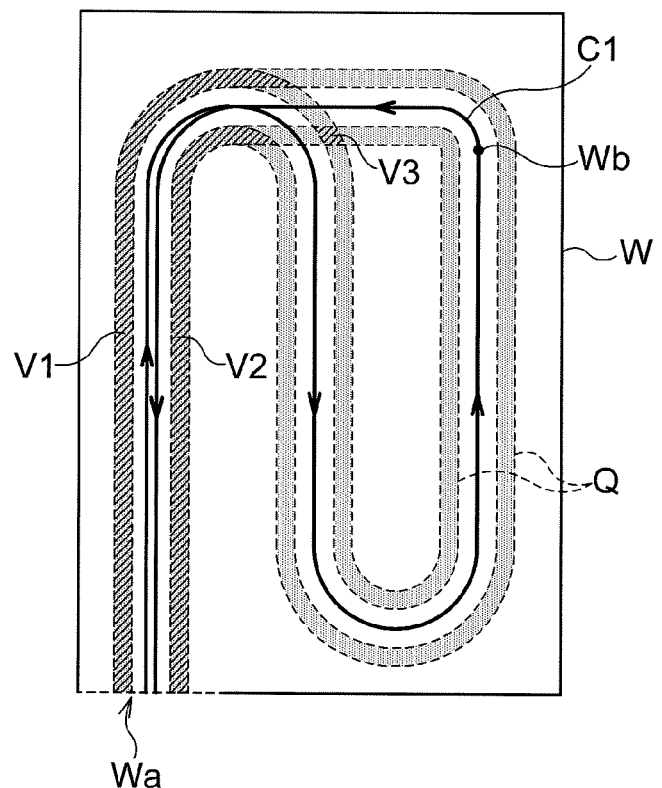
FIG. 7 is a view showing a first candidate route.

As shown in FIG. 7, in the first candidate route C1, a portion equal to or more than the half of the route from the work completion location Wb back to the exit/entrance Wa is overlapped with the portion from the entry to the field W via the exit/entrance Wa to the first turn. Incidentally, in FIG. 7, for the sake of convenience of illustration, these overlapped portions are shown with slight displacement from each other.

As a result, the ground-contact expected area Q corresponding to the first candidate route C1 includes, as area-overlapped portions, a first overlapped portion V1, a second overlapped portion V2, and a third overlapped portion V3. As shown in FIG. 7, the respective areas of the first overlapped portion V1 and the second overlapped portion V2 are relatively large. Whereas, the area of the third overlapped portion V3 is relatively small.

Figure 8:
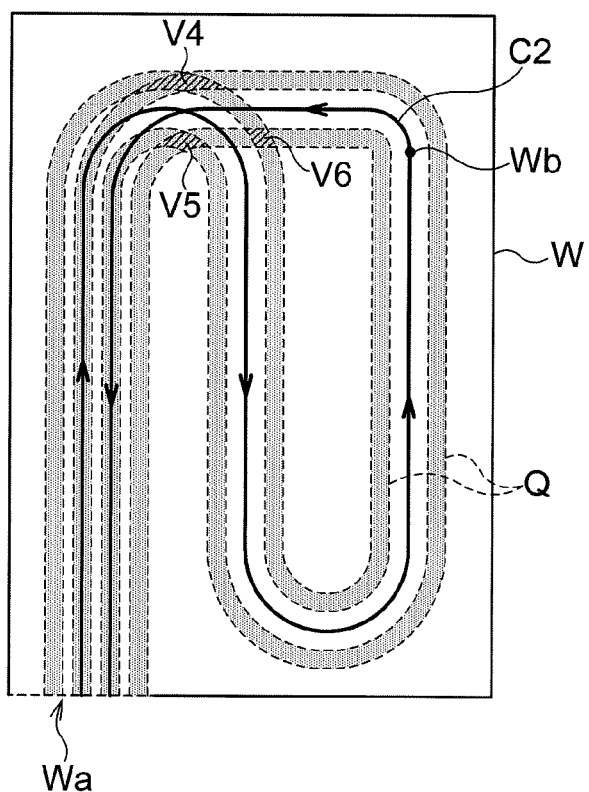
FIG. 8 is a view showing a second candidate route.

Further, as shown in FIG. 8, in the second candidate route C2, the route part from the work completion location Wb back to the exit/entrance Wa intersects the first turning route, being not overlapped with the other part.

As a result, the ground-contact expected area Q corresponding to the second candidate route C2 includes, as the area overlapped portions, a fourth overlapped portion V4, a fifth overlapped portion V5 and a sixth overlapped portion V6. As shown in FIG. 8, respective areas of the fourth overlapped portion V4, the fifth overlapped portion V5 and the sixth overlapped portion V6 are relatively small.

And, the route selection section 26 makes comparison between the sum of the respective areas of the first overlapped portion V1, the second overlapped portion V2 and the third overlapped portion V3 and the sum of the respective areas of the fourth overlapped portion V4, the fifth overlapped portion V5 and the sixth overlapped portion V6. In this specific example, the sum of the respective areas of the fourth overlapped portion V4, the fifth overlapped portion V5 and the sixth overlapped portion V6 is smaller than the sum of the respective areas of the first overlapped portion V1, the second overlapped portion V2 and the third overlapped portion V3.

Therefore, between the first candidate route C1 and the second candidate route C2, the route selection section 26 selects the second candidate route C2 as a candidate route which has the smallest area overlapped portion in the corresponding ground-contact expected area Q. And, this selected second candidate route C2 is determined as the target traveling route L.

[Displaying of Target Traveling Route and Ground-Contact Expected Area]

As shown in FIG. 2, the target traveling route L determined by the route determination section 2 is sent to the touch panel 52 together with the calculated ground-contact expected area Q. And, the touch panel 52 displays the target traveling route L as illustrated in FIG. 3 and FIG. 4.

As shown in FIG. 3, the touch panel 52 can display simultaneously portions in the target traveling route L where the tractor 100 has not yet traveled and the ground-contacted area P.

Figure 9:
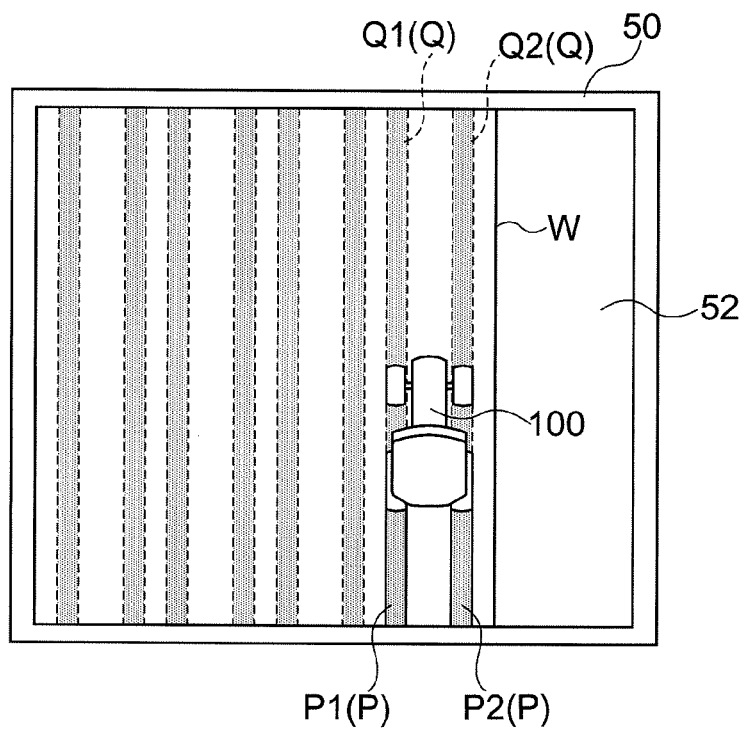
FIG. 9 is a view showing display contents of the touch panel.

Also, the touch panel 52 displays the ground-contact expected area Q as illustrated in FIG. 9. Incidentally, as shown in FIG. 9, the touch panel 52 can display simultaneously the ground-contacted area P and the ground-contact expected area Q.

Referring to the ground-contact expected area Q in greater details, the ground-contact expected area calculation section 22 calculates a first ground-contact expected area Q1 and a second ground-contact expected area Q2. The first ground-contact expected area Q1 is the ground-contact expected area Q corresponding to the left rear wheel 33 and the second ground-contact expected area Q2 is the ground-contact expected area corresponding to the right rear wheel 34.

Namely, the ground-contact expected area calculation section 22 in the instant embodiment calculates two ground-contact expected areas Q in correspondence with the left rear wheel 33 and the right rear wheel 34.

However, the present invention is not limited to the above. For instance, the ground-contact expected area calculation section 22 may be configured to calculate four ground-contact expected areas Q in correspondence with the left front wheel 31, the right front wheel 32, the left rear wheel 33 and the right rear wheel 34. Further alternatively, the ground-contact expected area calculation section 22 may be configured to calculate one ground-contact expected area Q.

Namely, the number of the ground-contact expected area(s) to be calculated by the ground-contact expected area calculation section 22 may be any number equal to or greater than one.

Further, in response to an operator's operation on the touch panel 52, the touch panel 52, as shown in FIG. 3 and FIG. 9, switchably display the ground-contact expected area Q or the target traveling route L.

Namely, the touch panel 52 is capable of switchably displaying the ground-contact expected area Q or the target traveling route L.

Figure 10:
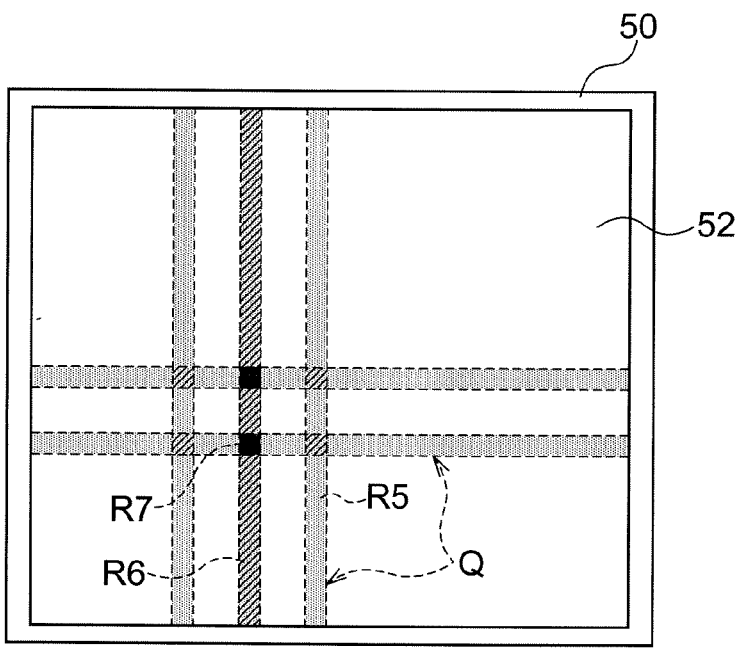
FIG. 10 is a view showing ground-contact expected areas displayed on the touch panel.

Further, as shown in FIG. 10, the touch panel 52 displays the portions in the ground-contact expected areas Q where the ground-contact expected areas Q are mutually overlapped in displaying modes different in accordance with the number of such mutually overlapped ground-contact expected areas Q.

More particularly, the touch panel 52 displays the portion in the ground-contact expected area Q where no mutual overlapping between the ground-contact expected areas Q is present in water color. Further, the touch panel 52 displays the portion in the ground-contact expected area Q where two ground-contact expected areas Q are overlapped with each other in blue color. And, the touch panel 52 displays the portion in the ground-contact expected area Q where three ground-contact expected areas Q are overlapped with each other in black color.

Namely, the touch panel 52 displays the portions in the ground-contact expected areas Q where the ground-contact expected areas Q are mutually overlapped in displaying modes different in accordance with the number of such mutually overlapped ground-contact expected areas Q.

In the example shown in FIG. 10, the tractor 100 is planned to pass the fifth area R5 only once. Namely, the fifth area R5 is planned to be ground-contacted by the left rear wheel 33 or the right rear wheel 34 only once.

Further, the tractor 100 is planned to pass the sixth area R6 two times. Namely, the sixth area R6 is planned to be ground-contacted by the left rear wheel 33 or the right rear wheel 34 two times.

Further, the tractor 100 is planned to pass the seventh area R7 three times. Namely, the seventh area R7 is planned to be ground-contacted by the left rear wheel 33 or the right rear wheel 34 three times.

In the above, of the ground-contact expected areas Q, in the fifth area R5, the ground-contact expected areas Q are not mutually overlapped. Therefore, the fifth area R5 is displayed in the water color.

Further, of the ground-contact expected areas Q, in the sixth area R6, two ground-contact expected areas Q are overlapped. Therefore, the sixth area R6 is displayed in the blue color.

Further, of the ground-contact expected areas Q, in the seventh area R7, three ground-contact expected areas Q are overlapped. Therefore, the seventh area R7 is displayed in the black color.

Figure 11:
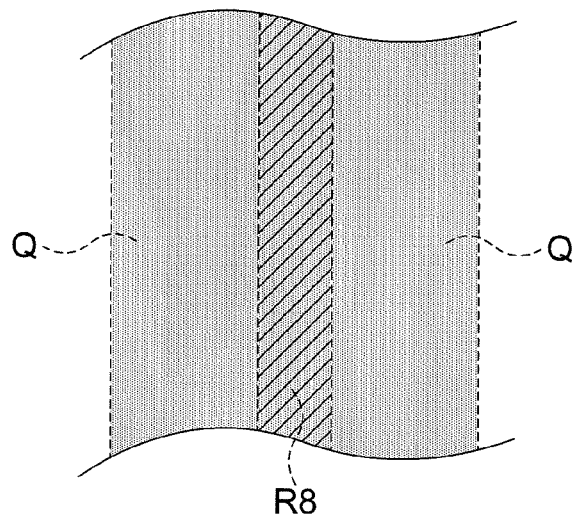
FIG. 11 is a view showing ground-contact expected areas displayed on the touch panel.

Also, in the example shown in FIG. 11, in the eighth area R8, two ground-contact expected areas Q are partially overlapped with each other. In this case, of the ground-contact expected areas Q, the eighth area R8 alone is displayed in the blue color and the remaining portions thereof are displayed in the water color.

[Estimation of Crushing Work Timing]

As shown in FIG. 2, the soil compaction degree calculated by the soil compaction degree calculation section 7 is sent to the crushing work timing estimation section 12. Further, when the target traveling route L is determined by the route determination section 2, this calculated soil compaction degree is sent also to the crushing work timing estimation section 12.

The crushing work timing estimation section 12 estimates a timing needing a subsoil crushing work, based on the soil compaction degree received from the soil compaction degree calculation section 7 and the soil compaction degree received from the route determination section 2. The result of this estimation by the crushing work timing estimation section 12 is sent to the touch panel 52. And, the touch panel 52 displays the timing needing subsoil crushing work, based on the estimation result provided by the crushing work timing estimation section 12. Further, the touch panel 52 displays when the timing needing the subsoil crushing work has come.

[Colors of Alarming Display]

As shown in FIG. 2, the soil compaction degree calculated by the soil compaction degree calculation section 7 is sent to the soil compaction degree determination section 9.

The soil compaction degree determination section 9 determines whether the soil compaction degree received from the soil compaction degree calculation section 7 is equal to or greater than a predetermined second threshold value or not. If the soil compaction degree is determined to be equal to or greater than the second threshold value, the soil compaction degree determination section 9 sends an alarm signal to the touch panel 53. Upon receipt of this alarm signal, the touch panel 52 issues an alarm by effecting an alarm display.

With this alarm display, the operator can learn that the degree of compaction of the soil has reached a relatively high level.

Meanwhile, in the instant embodiment, in case any one of the respective soil compaction degrees corresponding to the respective positions in the ground-contacted areas P is equal to or greater than the second threshold value, the soil compaction degree is determined to be equal to or greater than the second threshold value. However, the present invention is not limited to this. Alternatively, the soil compaction degree may be determined to be equal to or greater than the second threshold value in case an average value of the respective soil compaction degrees corresponding to the respective positions in the ground-contacted areas P is equal to or greater than the second threshold value.

Further, as shown in FIG. 2, when the target traveling route is determined by the route determination section 2, the calculated expected compaction degree is sent to the expected compaction degree determination section 11.

The expected compaction degree determination section 11 determines whether the expected compaction degree received from the route determination section 2 is equal to or greater than the second threshold value or not. If the expected compaction degree is determined to be equal to or greater than the second threshold value, the expected compaction degree determination section 11 sends an alarm signal to the touch panel 53. Upon receipt of this alarm signal, the touch panel 52 issues an alarm by effecting an alarm display.

With this alarm display, the operator can learn that the expected degree of compaction of the soil has reached a relatively high level.

Meanwhile, in the instant embodiment, in case any one of the respective expected compaction degrees corresponding to the respective positions in the ground-contact expected areas Q is equal to or greater than the second threshold value, the expected compaction degree is determined to be equal to or greater than the second threshold value. However, the present invention is not limited to this. Alternatively, the expected compaction degree may be determined to be equal to or greater than the second threshold value in case an average value of the respective expected compaction degrees corresponding to the respective positions in the ground-contact expected areas Q is equal to or greater than the second threshold value.

[Distributed Route Determination and Concentrated Route Determination]

In case the tractor 100 is to travel in the field W after a work vehicle other than this tractor 100 has traveled in the field W, the route determination section 2 can determine the target traveling route L by either distributed route determination or concentrated route determination.

In the following discussion, the other work vehicle will be referred to as a "preceding work vehicle" and the distributed route determination and the concentrated route determination will be explained in details.

In case such preceding work vehicle has traveled in the field W, though not shown in FIG. 2, the positions and the traveling directions of the preceding work vehicle during its traveling are sent to the ground-contacted area calculation section 5. And, the ground-contacted area calculation section 5 calculates the ground-contacted areas P, based on such received positions and traveling directions of the preceding work vehicle and information received from the field information acquisition section 8.

Incidentally, the ground-contacted areas P calculated in the above are the areas where the preceding work vehicle came into contact with the ground surface in the field W.

Figure 12:
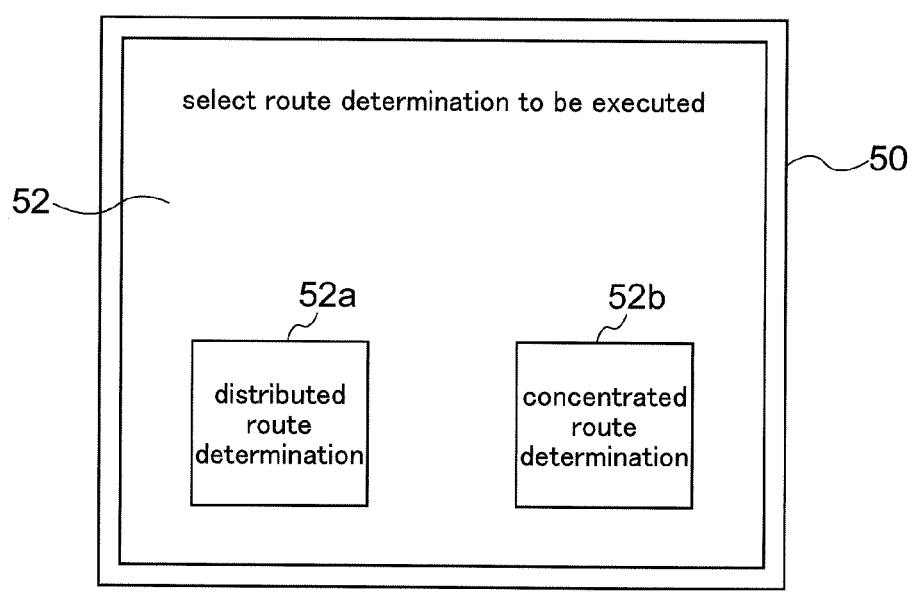
FIG. 12 is a view showing a selection screen displayed on the touch panel.

And, such calculated ground-contacted areas P are stored in the storage section 6. Thereafter, when the tractor 100 is about to start its traveling in the field W, as shown in FIG. 12, the touch panel 52 displays a selection screen thereon. In this selection screen, a distributed route determination button 52a and a concentrated route determination button 52b are displayed.

If the operator touches the distributed route determination button 52a, as shown in FIG. 2, a predetermined signal is sent from the touch panel 52 to the selection section 27. And, upon receipt of this signal, the selection section 27 sends to the route determination section 2 an instruction signal for causing the distributed route determination to be executed. Thus, upon receipt of this instruction signal, the route determination section 2 determines the target traveling route L by the distributed route determination. Namely, the route determination section 2 can execute the distributed route determination in response to an operator's input.

Further, if the operator touches the concentrated route determination button 52b, as shown in FIG. 2, a predetermined signal is sent from the touch panel 52 to the selection section 27. And, upon receipt of this signal, the selection section 27 sends to the route determination section 2 an instruction signal for causing the concentrated route determination to be executed. Thus, upon receipt of this instruction signal, the route determination section 2 determines the target traveling route L by the concentrated route determination. Namely, the route determination section 2 can execute the concentrated route determination in response to an operator's input.

Incidentally, the present invention is not limited to the above. Alternatively, the route determination section 2 may be configured to be able to execute any other process than the distributed route determination and the concentrated route determination. And, in the selection screen described above, a button corresponding to such other process than the distributed route determination and the concentrated route determination may be displayed.

Namely, the selection section 27 selects a process to be executed by the route determination section 2 from a plurality of kinds of processes including the distributed route determination and the concentrated route determination, in accordance with an operator's input.

In the instant embodiment, in the distributed route determination, the route determination section 2 determines the target traveling route L such that a portion in the ground-contact expected area Q overlapped with a ground-contacted area P may be small. Further, in the concentrated route determination, the route determination section 2 determines the target traveling route L such that a portion in the ground-contact expected area Q overlapped with a ground-contacted area P may be large.

In the following, with reference to FIG. 13, the distributed route determination and the concentrated route determination will be explained by way of a specific example. In this specific example, it is assumed that the preceding work vehicle entered the field W via a first exit/entrance Wc and made a U-turn and then has reached a second exit/entrance Wd and thereafter, the tractor 100 too is to enter the field W via the first exit/entrance Wc and make a U-turn and then to reach the second exit/entrance Wd.

Here, when the tractor 100 is about to start its traveling in the field W, as described above, the touch panel 52 displays the selection screen. In this, a plurality of candidate routes are calculated by the route calculation section 21.

Figure 13:
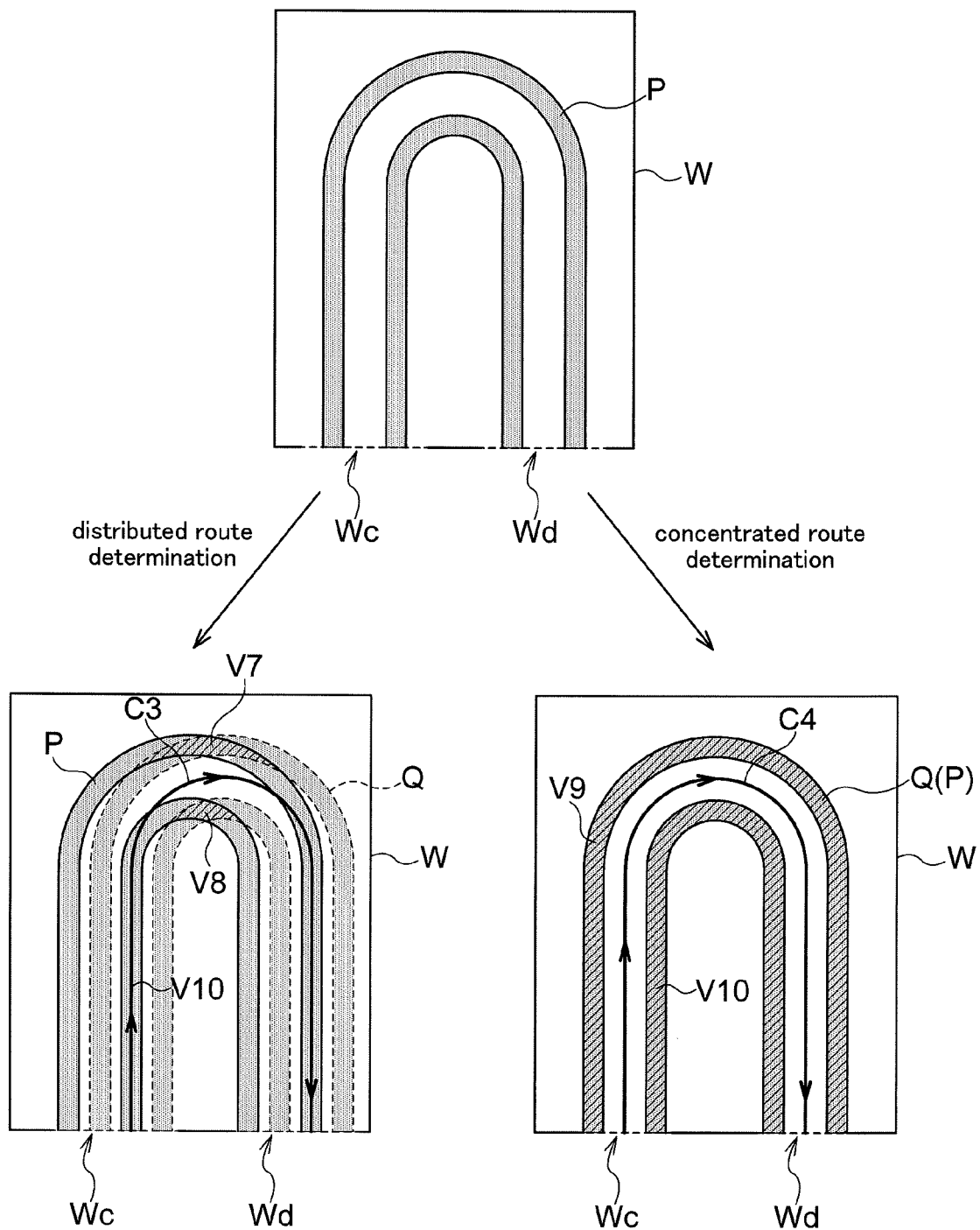
FIG. 13 is an explanatory view of a distributed route determination and a concentrated route determination.

In the example shown in FIG. 13, the calculated plurality of candidate routes include a third candidate route C3 and a fourth candidate route C4. The third candidate route C3 is the route having the smallest overlap between the corresponding ground-contact expected area Q and the ground-contacted area P, among the calculated plurality of candidate routes. Further, the fourth candidate route C4 is the route having the largest overlap between the corresponding ground-contact expected area Q and the ground-contacted area P, among the calculated plurality of candidate routes.

In fact, as shown in FIG. 13, the ground-contact expected area Q corresponding to the third candidate route C3 contains a seventh overlapped portion V7 and an eighth overlapped portion V8, as its portion overlapped with the ground-contacted area P. And, the respective areas of the seventh overlapped portion V7 and the eighth overlapped portion V8 are relatively small.

Further, the ground-contact expected area Q corresponding to the fourth candidate route C4 contains a ninth overlapped portion V9 and a tenth overlapped portion V10, as its portion overlapped with the ground-contacted area P. And, the respective areas of the ninth overlapped portion V9 and the tenth overlapped portion V10 are relatively large.

Incidentally, in this example, the ground-contact expected area Q corresponding to the fourth candidate route C4 is in agreement with the ground-contacted area P. Namely, the entire ground-contact expected area Q corresponding to the fourth candidate route C4 is occupied by the ninth overlapped portion V9 and the tenth overlapped portion V10.

And, if the operator touches the distributed route determination button 52a, the route determination section 2 executes the distributed route determination. With this, the route selection section 26 selects the third candidate route C3 among the calculated plurality of candidate routes. The selected third candidate route C3 is determined as the target traveling route L.

Further, if the operator touches the concentrated route determination button 52b, the route determination section 2 executes the concentrated route determination. With this, the route selection section 26 selects the fourth candidate route C4 among the calculated plurality of candidate routes. The selected fourth candidate route C4 is determined as the target traveling route L.

Incidentally, in the arrangement described above, the route calculation section 21 calculates a plurality of candidate routes, before the operator touches the distributed route determination button 52a or the concentrated route determination button 52b. However, the present invention is not limited thereto. Alternatively, the route calculation section 21 may calculate a plurality of candidate routes, after the operator touches the distributed route determination button 52a or the concentrated route determination button 52b.

Further, in the distributed route determination, the route determination section 2 may determine the target traveling route L such that the number of the portions in the ground-contact expected areas Q overlapped with the ground-contacted expected area Q may become equal to or greater than a predetermined number.

Also, in the foregoing explanation, there was explained the case in which the tractor 100 travels in the field W after another work vehicle than the tractor 100 has traveled in the field W. However, also in the case of the tractor 100 traveling in the field W again after this tractor 100 has traveled in the field W, the route determination section 2 may determine the target traveling route L by the distribution route determination or the concentrated route determination, in the same manner as the foregoing explanation.

With the above-described configuration, the operator can grasp the ground-contacted areas P by viewing the touch panel 52. Therefore, the operator can readily cause the tractor 100 to travel in such a manner as to cause the left rear wheel 33 and the right rear wheel 34 to circumvent the ground-contacted areas P. With this, it is readily possible to prevent the left rear wheel 33 and the right rear wheel 34 from coming into contact with the ground surface for a plurality of times at a same position in the field W.

Further, with the above-described configuration, it is readily possible to determine the target traveling route L such that the portions where the left rear wheel 33 and the right rear wheel 34 come into contact with the ground surface for a plurality of times in the field W may be relatively small or few.

Namely, with the above-described configuration, it is possible to realize a traveling assisting device A for a tractor 100 that makes it readily possible to avoid local compaction of the soil.

First Alternative Embodiment

In the foregoing embodiment, the route selection section 26 selects each candidate route that satisfies the condition of "the corresponding expected compaction degree is equal to or smaller than a predetermined first threshold value", among the respective candidate routes calculated by the route calculation section 21. And, the route selection section 26 selects a candidate route having the smallest area overlapped portion in the corresponding ground-contact expected area Q among the extracted respective candidate routes. And, such selected candidate route is determined as the target traveling route L.

However, the present invention is not limited to the above. In the following, respecting a first alternative embodiment relating to the present invention, an explanation will be made mainly on differences from the foregoing embodiment. The arrangements except for the portions explained below are same as the foregoing embodiment. Further, for the arrangements same as the foregoing embodiment, same reference signs will be used.

In the first alternative embodiment relating to the present invention, the route selection section 26 calculates an area overlapped portion in the corresponding ground-contact expected area Q, for each of respective candidate routes calculated by the route calculation section 21.

Next, the route selection section 26 extracts each candidate route that satisfies a condition of "the corresponding expected compaction degree is equal to or smaller than a predetermined first threshold value", AND the number of area overlapped portions in the corresponding ground-contact expected area Q is equal to or smaller than a predetermined number", among the respective candidate routes.

And, the route selection section 26 selects a candidate route having the best work efficiency among the extracted respective candidate routes. And, the selected candidate route is determined as the target traveling route L.

As explained above, in the first alternative embodiment relating to the present invention, the route determination section 2 determines the target traveling route L such that the number of the portions in the ground-contact expected area Q overlapped with a ground-contacted area P or portions of the ground-contact expected areas Q being mutually overlapped may be equal to or fewer than a predetermined number.

Incidentally, the timing for the route determination section 2 to determine the target traveling route L may be before the tractor 100 starts its work traveling in the field W or after it starts the work traveling.

In case the target traveling route L is determined before the tractor 100 starts the work traveling in the field W, no ground-contacted area P is present yet. Therefore, in such case, the route determination section 2 will determine the target traveling route L in such a manner that the number of portions of mutual overlapping of the ground-contact expected areas Q may be equal to or fewer than the predetermined number.

Incidentally, the respective embodiments described above are merely exemplary. The present invention is not limited thereto, and various modifications are possible.

Other Embodiments (1) The tractor 100 may be configured to be incapable of carrying out a work traveling by the automated (autonomous) driving, but capable of carrying out a work traveling by manual driving only.

(2) The touch panel 52 may be configured to display the portions of the ground-contacted areas P where the ground-contacted areas P are mutually overlapped in designs different in accordance with the number of such overlapped ground-contacted areas P. Further, the touch panel 52 may be configured to display the portions of the ground-contacted areas P where the ground-contacted areas P are mutually overlapped in display concentrations different in accordance with the number of such overlapped ground-contacted areas P.

(3) The soil compaction degree calculation section 7 may be configured to calculate one soil compaction degree corresponding to the ground-contacted area P as a whole.

(4) The expected compaction degree calculation section 25 may be configured to calculate one expected compaction degree corresponding to the ground-contacted area P as a whole.

(5) The route determination section 2 may be configured to determine the target traveling route L by temporarily calculating a traveling route first and then correcting the traveling route based on the ground-contact expected area Q.

(6) The touch panel 52 may be configured to display the portions of the ground-contact expected areas Q where the ground-contact expected areas Q are mutually overlapped in designs different in accordance with the number of such overlapped ground-contact expected areas Q. Further, the touch panel 52 may be configured to display the portions of the ground-contact expected areas Q where the ground-contact expected areas Q are mutually overlapped in display concentrations different in accordance with the number of such overlapped ground-contact expected areas Q.

(7) The traveling assisting device A may be provided outside the tractor 100. For instance, the traveling assisting device A may be provided in a management center which is installed outside the tractor 100 or may be provided in a portable communication terminal.

(8) A speaker, a lamp or the like may be provided to issue an alarm in case the soil compaction degree determination section 9 determines a soil compaction degree being equal to or greater than the second threshold value. In this case, the speaker, the lamp or the like corresponds to the "alarming section" relating to the present invention.

(9) The soil compaction degree determination section 9 may be omitted.

(10) The expected compaction degree determination section 11 may be omitted.

(11) The crushing work timing estimation section 12 may be omitted.

(12) The soil compaction degree calculation section 7 may be omitted.

(13) The compaction related information acquisition section 13 may be omitted.

(14) The expected compaction degree calculation section 25 may be omitted.

(15) The route determination section 2 may be configured to determine the target traveling route L, irrespectively of the expected compaction degree.

(16) The route determination section 2 may be configured to determine the target traveling route L, irrespectively of the area overlapped portion.

(17) The touch panel 52 may be configured to be incapable of displaying the target traveling route L.

(18) The route determination section 2 may be omitted.

(19) The touch panel 52 may be configured to be incapable of displaying the traveling trajectory T.

(20) The touch panel 52 may be configured to be incapable of displaying the ground-contact expected area Q.

(21) The touch panel 52 may be configured to display the portions of the ground-contacted areas P where the ground-contacted areas P are mutually overlapped in a uniform mode irrespectively of the number of such overlapped ground-contacted areas P. Further, the touch panel 52 may be configured to display the portions of the ground-contacted areas P where the ground-contacted areas P are mutually overlapped in a same mode as displaying of the non-overlapped portions.

(22) The touch panel 52 may be configured to display the portions of the ground-contact expected areas Q where the ground-contact expected areas Q are mutually overlapped in a uniform mode irrespectively of the number of such overlapped ground-contact expected areas Q. Further, the touch panel 52 may be configured to display the portions of the ground-contact expected areas Q where the ground-contact expected areas Q are mutually overlapped in a same mode as displaying of the non-overlapped portions.

(23) Instead of the traveling wheels 30, crawler type traveling devices may be provided. In this case, such crawler type traveling devices correspond to the "traveling device" relating to the present invention.

(24). The touch panel 52 may be configured to be incapable of displaying the ground-contacted areas P.

(25) The touch panel 52 may be configured to display the portions of the ground-contacted areas P where the ground-contacted areas P are mutually overlapped, with numerals different in accordance with the number of such overlapped ground-contacted areas P. Such numerals may be values indicative of ranks according to the numbers of the overlapped ground-contacted areas P or values indicative directly of the number per se of the overlapped ground-contacted areas P.

(26) The touch panel 52 may be configured to display the portions of the ground-contact expected areas Q where the ground-contact expected areas Q are mutually overlapped with numerals different in accordance with the number of such overlapped ground-contact expected areas Q. Such numerals may be values indicative of ranks according to the numbers of the overlapped ground-contact expected areas Q or values indicative directly of the number per se of the overlapped ground-contact expected areas Q.

(27) The touch panel 52 may be configured to display the portions of the ground-contacted areas P where the ground-contacted areas P are not overlapped with each other in a color other than the green color. Further, the touch panel 52 may be configured to display the portions of the ground-contacted areas P where two ground-contacted areas P are overlapped with each other in a color other than the yellow color. Further, the touch panel 52 may be configured to display the portions of the ground-contacted areas P where three ground-contacted areas P are overlapped with each other in a color other than the red color.

(28) The touch panel 52 may be configured display the portions of the ground-contact expected areas Q where the ground-contact expected areas Q are not overlapped with each other in a color other than the water color. Further, the touch panel 52 may be configured to display the portions of the ground-contact expected areas Q where two ground-contact expected areas Q are overlapped with each other in a color other than the blue color. Further, the touch panel 52 may be configured to display the portions of the ground-contact expected areas Q where three ground-contact expected areas Q are overlapped with each other in a color other than the black color.

INDUSTRIAL APPLICABILITY

The present invention is applicable not only to a tractor, but also to a self-threshing combine, a standard combine, a cone harvester, a rice planter, etc.

DESCRIPTION OF SIGNS

2: route determination section
6: storage section
7: soil compaction degree calculation section
9: soil compaction degree determination section
11: expected compaction degree determination section
12: crushing work timing estimation section
13: compaction related information acquisition section
25: expected compaction degree calculation section
27: selection section
33: left rear wheel (traveling device)
34: right rear wheel (traveling device)
52: touch panel (displaying section, alarming section)
100: tractor (work vehicle)
A: traveling assisting device
L: target traveling route
P: ground-contacted area
Q: ground-contact expected area
T: traveling trajectory
W: field

The invention claimed is:

1. A traveling assisting device for a work vehicle, the traveling assisting device including a controller on a microcomputer with a processor, wherein the traveling assisting device comprises:
 a route determination section that determines using the processor a target traveling route based on a ground-contact expected area which is an area where the traveling device is expected to contact the ground surface in a field,
 wherein the route determination section includes a route selection section that using the processor selects one candidate route from a plurality of candidate routes so that an area overlapped portion between ground-contact expected areas becomes minimal, and
 the route determination section determines using the processor that the one candidate route selected by the route selection section is the target traveling route, and further comprising:
 a display that displays a map of the field and the ground-contact expected areas overlaying the map of the field; and
 wherein the display displays the portions of the ground-contact expected area overlapped with another or other ground-contact expected area(s) in forms different from each other in accordance with the number of the overlapped ground-contact expected areas.

2. The traveling assisting device for the work vehicle of claim 1, wherein the route determination section determines using the processor the target traveling route so that of the ground-contact expected area, a portion thereof overlapped with another ground-contact expected area may be reduced.

3. The traveling assisting device for the work vehicle of claim 1, wherein the route determination section determines using the processor the target traveling route such that of the ground-contact expected area, portions thereof overlapped with another ground-contacted expected area may be reduced in number to be equal to or fewer than a predetermined number.

4. The traveling assisting device for the work vehicle of claim 1, wherein the controller further comprises:
   a compaction-related information acquisition section for acquiring using the processor compaction-related information which is information relating to compaction of the soil by the ground surface contact of the traveling device; and
   an expected compaction degree calculation section for calculating using the processor a degree of compaction expected to occur when the traveling device contacts the ground surface in the ground-contact expected area; and
   wherein the route determination section determines using the processor the target traveling route such that the expected compaction degree may become equal to or less than a predetermined first threshold value.

5. The traveling assisting device for the work vehicle of claim 4, wherein the compaction-related information acquisition section acquires using the processor at least any one of information indicative of an axle load (axle weight), information indicative of a vehicle speed, information indicative of a steering angle, information indicative of a traveling direction, information indicative of specification of the traveling device, information indicative of a slope of the ground surface, and information indicative of a number of passes made by the traveling device.

6. The traveling assisting device for the work vehicle of claim 4, wherein the controller further comprises:
   an expected-compaction degree determination section that determines using the processor whether the expected compaction degree exceeds a predetermined second threshold value or not; and
   an alarming section that using the processor issues an alarm if the expected compaction degree is determined to exceed the second threshold value.

7. The traveling assisting device for the work vehicle of claim 1, wherein the display is configured to be capable of switchably displaying the ground-contact expected area and the target traveling route.

8. The traveling assisting device for the work vehicle of claim 1, wherein:
   the display is capable of displaying a ground-contacted area which is an area where the traveling device has contacted the ground surface in the field; and
   the display is capable of simultaneously displaying a portion in the target traveling route where the work vehicle has not yet traveled and the ground-contacted areas.

9. The traveling assisting device for the work vehicle of claim 1, wherein the controller further comprises:
   a storage for storing using the processor a ground-contacted area which is an area where the traveling device has contacted the ground surface in the field; and
   the route determination section is capable of executing using the processor a distributed route determination which is a process to determine the target traveling route such that a portion of the ground-contact expected area overlapped with the ground-contacted area may be reduced or that the number of portions of the ground-contact expected area overlapped with the ground-contacted area may be equal to or less than a predetermined number.

10. The traveling assisting device for the work vehicle of claim 9, wherein:
    the route determination section is capable of executing using the processor a concentrated route determination which is a process to determine the target traveling route such that a portion of the ground-contact expected area overlapped with the ground-contacted area may be increased or that the number of portions of the ground-contact expected area overlapped with the ground-contacted area may be equal to or greater than a predetermined number; and
    there is provided a selection section capable of selecting using the processor a process to be executed by the route determination section from among a plurality of kinds of processes including the distributed route determination and the concentrated route determination.

11. The traveling assisting device for the work vehicle claim 1, wherein the controller further comprises:
    a storage for storing using the processor a ground-contacted area which is an area where the traveling device has contacted the ground surface in the field; and
    the route determination section is capable of executing using the processor a concentrated route determination which is a process to determine the target traveling route such that a portion of the ground-contact expected area overlapped with the ground-contacted area may be increased or that the number of portions of the ground-contact expected area overlapped with the ground-contacted area may be equal to or greater than a predetermined number.

12. A work vehicle including the traveling assisting device of claim 1.

13. A traveling assisting device for a work vehicle, the traveling assisting device including a controller on a microcomputer with a processor, wherein the traveling assisting device comprises:
    a storage for storing using the processor a ground-contacted area which is an area where the traveling device has contacted the ground surface in a field; and
    a display for displaying a map of the field and the ground-contacted area overlaying the map of the field,
    a route determination section that determines using the processor a target traveling route based on a ground-contact expected area which is an area where the traveling device is expected to contact the ground surface in the field,
    the display is capable of displaying the target traveling route; and
    the display is capable of simultaneously displaying a portion in the target traveling route where the work vehicle has not yet traveled and the ground-contacted area, and
    the display is capable of switchably displaying the ground-contacted area and a traveling trajectory,
    wherein the display displays the portions of the ground-contact expected area overlapped with another or other ground-contact expected area(s) in forms different from each other in accordance with the number of the overlapped ground-contact expected areas.

14. The traveling assisting device for the work vehicle of claim 13, wherein the storage using the processor stores at least two ground-contacted areas in correspondence with the traveling devices on the left and right sides.

15. The traveling assisting device for the work vehicle of claim 13, wherein the route determination section determines using the processor the target traveling route such that of the ground-contact expected area, a portion thereof overlapped with the ground-contacted area or a portion thereof overlapped with another ground-contact expected area may be reduced.

16. The traveling assisting device for the work vehicle of claim 13, wherein the route determination section determines using the processor the target traveling route such that of the ground-contact expected area, a portion thereof overlapped with the ground-contacted area or a portion thereof overlapped with another ground-contact expected area may be reduced in number to be equal to or fewer than a predetermined number.

17. The traveling assisting device for the work vehicle of claim 13, wherein the controller further comprises:
a compaction-related information acquisition section for acquiring using the processor compaction-related information which is information relating to compaction of the soil by the ground surface contact of the traveling device; and
an expected compaction degree calculation section for calculating using the processor a degree of compaction expected to occur when the traveling device contacts the ground surface in the ground-contact expected area; and
wherein the route determination section determines the target traveling route such that the expected compaction degree may become equal to or less than a predetermined first threshold value.

18. The traveling assisting device for the work vehicle of claim 17, wherein the compaction-related information acquisition section acquires using the processor any one of information indicative of an axle load, information indicative of a vehicle speed, information indicative of a steering angle, information indicative of a traveling direction, information indicative of specification of the traveling device, information indicative of a slope of the ground surface, and information indicative of a number of passes made by the traveling device.

19. The traveling assisting device for the work vehicle of claim 17, wherein there is provided a soil compaction degree calculation section for calculating using the processor a soil compaction degree which is a degree of the soil compaction in the ground-contacted area, based on the compaction-related information.

20. The traveling assisting device for the work vehicle of claim 19, wherein the controller further comprises:
a soil compaction degree determination section that determines using the processor whether the soil compaction degree exceeds a second threshold value or not; and
an alarming section that using the processor issues an alarm if the soil compaction degree determination section determines that the soil compaction degree exceeds the second threshold value.

21. A work vehicle including the traveling assisting device of claim 13.

22. A traveling assisting device for a work vehicle, the traveling assisting device including a controller on a microcomputer with a processor, wherein the traveling assisting device comprises:
a storage for storing using the processor a ground-contacted area which is an area where the traveling device has contacted the ground surface in a field; and
a display for displaying a map of the field and the ground-contacted area overlaying the map of the field,
a route determination section that determines using the processor a target traveling route based on a ground-contact expected area which is an area where the traveling device is expected to contact the ground surface in the field,
the display is capable of displaying the target traveling route; and
the display is capable of simultaneously displaying a portion in the target traveling route where the work vehicle has not yet traveled and the ground-contacted area, and
the display is capable of switchably displaying the ground-contacted area and a traveling trajectory, wherein the display displays the portions of the ground-contacted areas where the ground-contacted areas are overlapped with each other in a displaying mode which differs in accordance with the number of the overlapped ground-contacted areas so as to differently indicate once overlapped ground-contacted areas and twice overlapped ground-contacted areas.

* * * * *